(12) United States Patent
Srivastava

(10) Patent No.: US 10,099,929 B2
(45) Date of Patent: Oct. 16, 2018

(54) METHOD OF PRODUCING A GRAPHENE MATERIAL

(71) Applicant: GrafTech International Holdings, Inc., Independence, OH (US)

(72) Inventor: Iti Srivastava, Rocky River, OH (US)

(73) Assignee: NeoGraf Solutions, LLC, Lakewood, OH (US)

( * ) Notice: Subject to any disclaimer, the term of this patent is extended or adjusted under 35 U.S.C. 154(b) by 300 days.

(21) Appl. No.: 14/771,293

(22) PCT Filed: May 14, 2014

(86) PCT No.: PCT/US2014/037951
§ 371 (c)(1),
(2) Date: Aug. 28, 2015

(87) PCT Pub. No.: WO2014/200649
PCT Pub. Date: Dec. 18, 2014

(65) Prior Publication Data
US 2016/0002046 A1    Jan. 7, 2016

Related U.S. Application Data

(60) Provisional application No. 61/834,610, filed on Jun. 13, 2013.

(51) Int. Cl.
*C01B 31/04* (2006.01)
*C01B 32/184* (2017.01)
*C01B 32/19* (2017.01)

(52) U.S. Cl.
CPC ........ *C01B 31/0469* (2013.01); *C01B 32/184* (2017.08); *C01B 32/19* (2017.08); *C01B 2204/04* (2013.01)

(58) Field of Classification Search
CPC ... C01B 32/184; C01B 31/0469; C01B 32/19; C01B 2204/04; C01B 31/04; C01B 31/0407; C01B 31/0415; C01B 31/0423; C01B 31/043; C01B 31/0438; C01B 31/0446; C01B 31/0453; C01B 31/0461; C01B 31/0476
See application file for complete search history.

(56) References Cited

U.S. PATENT DOCUMENTS

| | | | |
|---|---|---|---|
| 4,876,077 A | 10/1989 | Murakami | |
| 5,029,760 A * | 7/1991 | Gamblin | B02C 17/08 241/137 |
| 8,132,746 B2 | 3/2012 | Zhamu et al. | |
| 2006/0164790 A1 | 7/2006 | Takeuchi et al. | |

(Continued)

OTHER PUBLICATIONS

Bianco, et al., Editorial All in the graphene family—A recommended nomenclature for two-dimensional carbon materials, Carbon 2013; 65: 1-6.*

(Continued)

*Primary Examiner* — Daniel McCracken

(57) ABSTRACT

A method of producing graphene powder includes the heat treatment of a graphitizable polymer film to at least 2000 degrees C. to form a heat treated film having a substantially turbostratic graphitic structure. The heat treated film is then sheared along a plane substantially parallel to a major surface of the heat treated film to form a particulate having a thickness less than 100 nanometers.

20 Claims, 3 Drawing Sheets

(56) References Cited

U.S. PATENT DOCUMENTS

2006/0216222 A1* 9/2006 Jang ................ B82Y 30/00
423/448
2009/0169467 A1 7/2009 Zhamu et al.
2011/0244210 A1 10/2011 Choi et al.
2013/0011732 A1 1/2013 Kim et al.

OTHER PUBLICATIONS

Distance Between Carbon Atoms, The Physics Factbook, accessed online at: https://hypertextbook.com/facts/2001/AliceWarrenGregory.shtml on Aug. 16, 2017.*
Definition of film, accessed online at https://www.merriam-webster.com/dictionary/film?src=search-dict-box on Jan. 19, 2018.*
International Search Report of PCT/US2014/037951 dated Sep. 19, 2014, 1 page.

* cited by examiner

METHOD OF PRODUCING A GRAPHENE MATERIAL

RELATED APPLICATIONS

This application is the U.S. National Phase under 35 U.S.C. § 371 of International Application No. PCT/US2014/037951, filed on Feb. May 14, 2014, which claims the benefit of U.S. Provisional Application No. 61/834,610 filed Jun. 13, 2013, the disclosures of which Applications are incorporated herein in their entirety by reference.

Graphene is a material formed of carbon atoms arranged in a regular planar hexagonal pattern of $sp^2$-hybridized carbon atoms. A single graphene layer is a two-dimensional, one-atom thick layer. In many materials, for example, mined natural graphite, many graphene layers are arranged in a stacked configuration to form a crystalline flake of graphite. The graphene layers in natural graphite are coupled together by weak Van der Waals forces.

Graphene can be produced in a variety of methods including, the scotch tape or drawing method, vapor deposition on a substrate, and chemical intercalation followed by heat treatment, thereby causing the graphene layers to expand and enable separation. Drawbacks remain in the above referenced techniques. For example, chemical intercalation requires potentially hazardous chemicals and could leave impurities in the final graphene material. Vapor deposition results in highly pure material, but is inefficient and expensive.

SUMMARY OF THE INVENTION

According to one aspect, a method of producing a graphene powder includes heat treating to at least 2000 degrees C. a graphitizable polymer film having a thickness from between about 10 microns to about 200 microns. The heat treated film has a substantially turbostratic graphitic structure. Thereafter, shearing the heat treated film along a plane substantially parallel to a major surface of the heat treated film to form a particulate wherein said particulate has a thickness less than about 1000 nanometers; particular preferred embodiments include less than 500 nanometers, less than 250 nanometers and no more than 100 nanometers.

DETAILED DESCRIPTION

Figure 1:
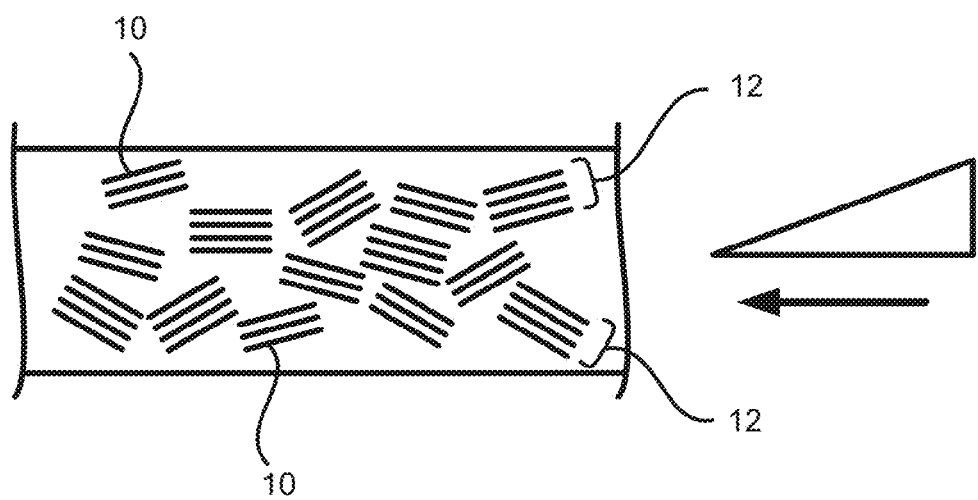
FIG. 1 is a schematic view of a turbostratic heat treated graphitizable polymer.

In one embodiment, a powder material is produced in accordance with the method to be described herein below. The powder material includes a graphitic structure having a plurality of stacked graphene layers. Each graphene layer (also referred to herein as a basal plane), is a two-dimensional hexagonal structure of carbon atoms. The powder material is generally plate shaped, having a diameter (represented by the largest lateral distance in the direction parallel to the basal plane) and a thickness perpendicular to the basal plane. Advantageously, graphene based particles of varying diameter and thickness may be produced in accordance with the methods described herein below. In one embodiment, the graphene particles have a diameter from between about 1 micron and about 200 microns, still more advantageously, the graphene particulates have a diameter from between about 50 microns and about 150 microns. In other embodiments, the diameter of the graphene particulates are less than about 200 microns, more advantageously less than about 150 microns, and still more advantageously less than about 100 microns. One particular preferred range of diameters is about 70 to about 92 microns. The diameter of the particulate can be measured by a MicroTrac.

In one embodiment, the thickness of the graphene particulates are from between about 1 nanometer and about 100 nanometers. In other embodiments, the thickness of the graphene particulates are from between about 50 and about 150 nanometers. In one embodiment, the thickness of the graphene particulates are advantageously less than about 100 nanometers, more advantageously less than about 50 nanometers, and still more advantageously less than about 25 nanometers. Further embodiments may include particulates with a thickness of less than 500 nanometers, more preferably less than 200 nanometers. In one embodiment, the graphene particulates have a specific surface area of from between about 100 $m^2$/gram to about 700 $m^2$/gram. In other embodiments, the graphene particulates have a specific surface area of from between about 200 $m^2$/gram to about 500 $m^2$/gram. In still further embodiments, the specific surface area is greater than 200 $m^2$/gram, still more advantageously greater than 300 $m^2$/gram, and still more advantageously greater than 500 $m^2$/gram.

The powder material may be produced by a process including the steps of: heat treating a thin film graphitizable polymer, and mechanical shearing of the heat treated thin film into particles having a thickness less than about 1000 nanometers, preferably less than 500 nanometers, more preferably less than 250 nanometers, even more preferably no more than 100 nanometers and in certain embodiments no more than 75 nanometers.

Precursor films of graphitizable polymer, prior to heat treatment, are advantageously from between about 10 microns to about 200 microns thick. In other embodiments, the precursor graphitizable polymer film is from between about 25 microns to about 75 microns thick. In further embodiments, the precursor graphitizable polymer is less than 200 microns thick, more advantageously less than 150 microns thick, and still more advantageously less than 75 microns thick. In one embodiment, graphitizable polymers may include at least one polymer selected from the group of polyphenylenoxadiazoles (POD), polybenzothiazole (PBT), polybenzobisthiazole (PBBT), polybenzooxazole (PBO), polybenzobisoxazole (PBBO), aromatic polyimides (PI), aromatic polyamides (PA), polypyromellitimide, polyphenyleneisophthalimamide, polyphenylenbenzoimidazole (PBI), polyphenylenebenzobisimidazole (PPBI), polythiazole (PT), poly-p-phenylenevinylene (PPV) or mixtures thereof.

The heat treatment of the graphitizable polymer is performed in a substantially oxygen free atmosphere. In one embodiment the atmosphere is an inert atmosphere, for example, helium, argon, nitrogen or the like. In other embodiments, the heat treatment is performed in a vacuum. In another embodiment, the graphitizable polymer is first carbonized before the final heat treatment. Carbonization may be achieved in a non-oxygen containing atmosphere and at temperatures from between about 400 degrees C. to about 2000 degrees C., preferably to a temperature of less than 2000 degrees C.

The heat treatment is advantageously performed to a temperature from between about 2000 degrees C. and about 3200 degrees C. for an amount of time sufficient to convert the polymer to a substantially turbostratic graphite and less than the amount of time necessary to convert the turbostratic graphite to highly aligned graphite film. In further embodiments, the heat treatment is from between about 2200 degrees C. and about 2600 degrees C. In one embodiment, the graphitizable polymer is heat treated to at least 2200 degrees C. In other embodiments, the graphitizable polymer is heat treated to at least 2400 degrees C. In still further embodiments, the graphitizable polymer is heat treated to a temperature less than 3000 degrees C. In further embodiments, the graphitizable polymer is heat treated to a temperature less than 2600 degrees C. In still further embodiments, the graphitizable polymer is graphitized in a continuous furnace. In other embodiments, the graphitizable polymer is graphitized in a batch furnace.

Heat treatment of the graphitizable polymer to about 2,000 degrees C. causes the conversion of the polymer (or carbon material if carbonized in an initial step) to a glassy carbon phase. At this point the material is amorphous, lacking long range order with minimal graphite formation. With reference now to FIG. 1, as the temperature increases to the final heat treatment temperature the glassy carbon converts to a turbostratic graphite structure. As is shown, the turbostratic structure includes the formation of individual graphene planes 10. These graphene planes are arranged in aligned stacks 12 being parallel and from between about 5 graphene layers to about 200 graphene layers, or from about 17 Å to about 750 Å $L_c$. Because heat treatment is terminated prior to formation of highly aligned graphite the turbostratic structure remains so that the graphene stacks remain substantially unaligned. Though not to be bound by theory, it is believed that if a higher $L_c$ is desired between different samples, the sample which the higher $L_c$ is desired should be heat treated to a higher final temperature or exposing the sample to a given constant temperature for a longer period of time than previous heating treating steps at the same temperature.

According to one embodiment, the heat treated graphitizable polymer exhibits an (002) peak d-spacing measured by x-ray diffraction from between about 3.3500 Å to about 3.4300 Å. In other embodiments, the (002) peak d-spacing is from between about 3.3512 Å to about 3.3700 Å. In other embodiments, the (002) peak d-spacing is greater than about 3.3500 Å. In further embodiments, the (002) peak d-spacing is greater than about 3.3512 Å. In further embodiments, the heat treated graphitizable polymer exhibits a crystal size Lc measured by x-ray diffraction of from between about 33 Å to about 750 Å. In further embodiments the crystal size Lc is from between about 50 Å to about 600 Å, preferably about 200 Å to about 450 Å. In still further embodiments, the crystal size is less than about 750 Å. In other embodiments, the crystal size is less than about 500 Å.

The next step includes subjecting the heat treated graphitizable polymer film to a shearing step along the longitudinal axis of the film. This shearing of the heat treated graphitizable polymer film produces a powder including nano-scaled graphene plate material. By shearing the heat treated graphitizable polymer film, the graphene planes are delaminated within graphene stacks. Further, shearing separates graphene stacks from other graphene stacks resulting in the powder material described herein above. By performing a shearing step, (as opposed to, for example a ball mill which impacts the precursor material in all directions including normal to the plane of the precursor material) the graphene planes are substantially maintained.

In one embodiment, the shearing step is a mechanical shearing process, wherein a blade or other projection contacts the heat treated graphitizable material in a direction substantially parallel to the major surface thereof. In another embodiment, the mechanical shearing process may be performed using a centrifugal mill, wherein the particle size reduction occurs as an outcome of shearing and impact effects between a rotor and a fixed ring sleeve. Though a centrifugal mill is disclosed above, other methods of shearing may be employed wherein at least a substantial portion of the milling or comminution is performed by a shearing blade or other force in a direction substantially parallel to the major surface of the heat treated graphitizable material. In the case of using a centrifugal mill, a typical, non-limiting example of speed is about 1000-30000 rpms. On particular example is a speed between 15000-25000 rpms, however any speed may be applicable given the apparatus being used. An exemplary milling time may include about five (5) to twenty-five (25) seconds. However other milling times may be implemented as desired. The aforementioned speed and/or milling time are not limiting factors of the disclosure.

One particular batch of particulates made in accordance with the method disclosed herein had an average particulate thickness of about 1 micron with a standard deviation of about 0.6 microns. The particle thickness ranged from about 75 nanometers to about 2 microns.

The method disclosed herein may be used to create a high aspect ratio graphene material or if graphene is not desired, a high aspect ratio graphite material. A Microtrac laser analyzer may be used to determine the diameter of the milled material and SEM may be used to determine the thickness of the material.

The embodiments disclosed herein will now be further described by the below non-limiting examples.

EXAMPLES

Thirty (30) sheets of a polymer, each having a thickness of about 2 mils was graphitized to a temperature of 2600° C. in a furnace, thereby producing a graphite sheet. The graphite sheet was allowed to cool and subsequently a centrifugal mill was used to shear mill the graphite sheet into particles. The sheets were milled to an average particle size of about 1000 nanometers, with a standard deviation of 0.6 microns. Between the various sheets, the range of particles was from 2000 nanometers to 75 nanometers.

Figure 2:
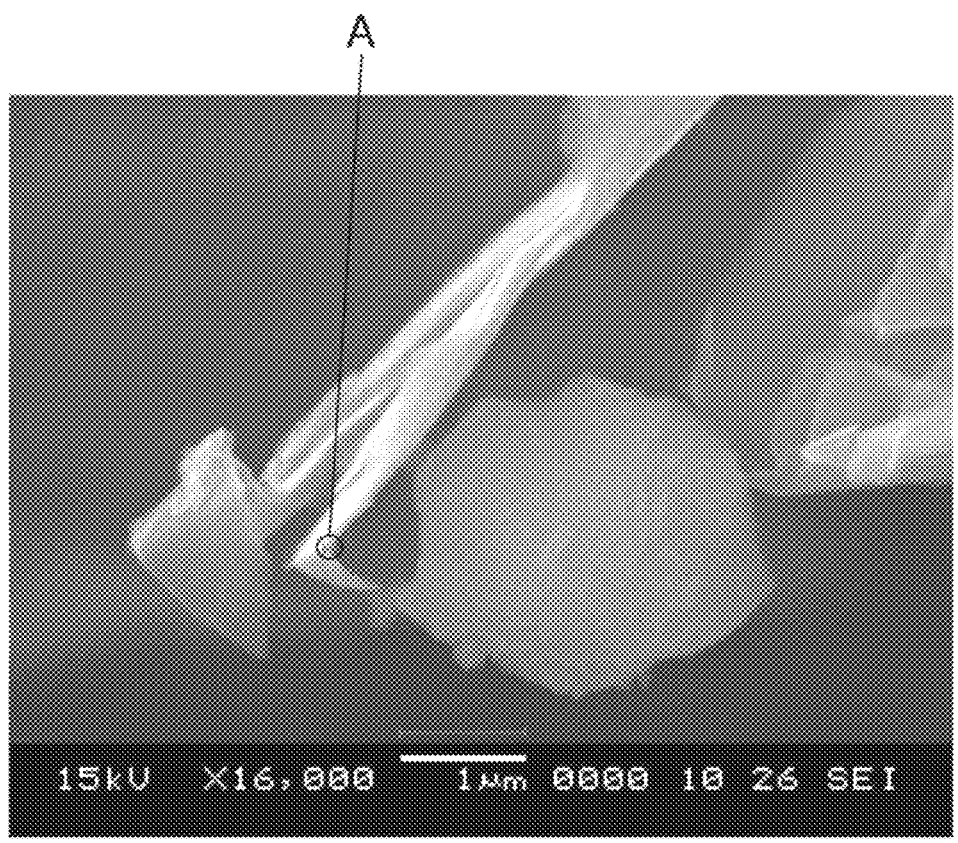
FIG. 2 is an isometric view of a particle of an embodiment disclosed herein by SEM.
Figure 3:
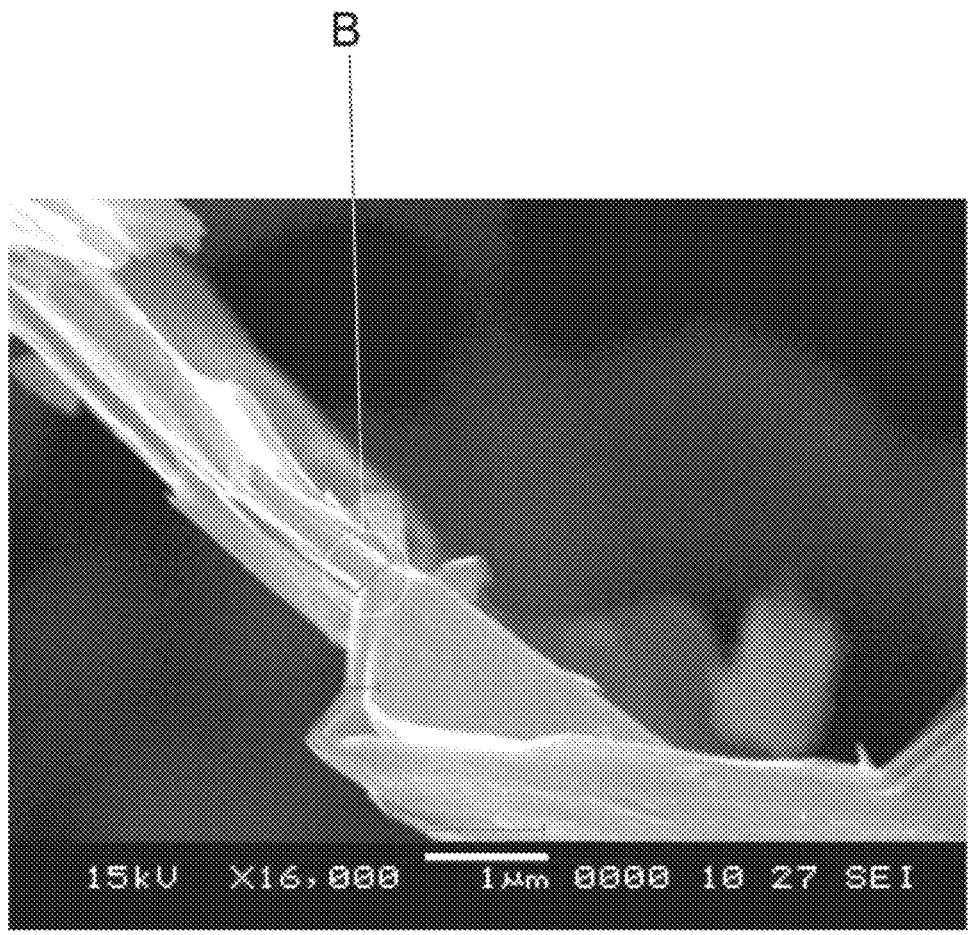
FIG. 3 is an isometric view of another embodiment of a particle disclosed herein by SEM.

Shown in FIG. 2 is an isometric view of one of the particles made in the above paragraph. The particle shown in FIG. 2 has a thickness of 75 nanometers, measured by SEM as shown in circle A. Shown in FIG. 3 is an isometric view of another particle made in the above example. The particle shown in FIG. 3 has a thickness of 500 nanometers as shown in circle B.

Although preferred embodiments of the disclosure have been described using specific terms, devices, and methods, such description is for illustrative purposes only. The words used are words of description rather than of limitation. It is to be understood that changes and variations may be made by those of ordinary skill in the art without departing from the spirit or the scope of the present disclosure, which is set forth in the following claims. In addition, it should be understood that aspects of the various embodiments may be interchanged both in whole or in part. Therefore, the spirit and scope of the appended claims should not be limited to the description of the preferred versions contained therein.

The above description is intended to enable the person skilled in the art to practice the invention. It is not intended to detail all the possible variations and modifications that will become apparent to the skilled worker upon reading the description. It is intended, however, that all such modifications and variations be included within the scope of the invention that is defined by the following claims.

I claim:

1. A method of producing a graphene powder comprising:
    heat treating to between 2000 degrees C. and 2600 degrees C. a graphitizable polymer film having a thickness from between about 10 microns to about 200 microns thereby forming a heat treated film having a turbostratic graphitic structure of stacks of aligned graphene planes of between 5 graphene layers to 200 graphene layers, wherein the stacks are unaligned; and
    shearing the heat treated film along a plane parallel to a major surface of the heat treated film to delaminate the graphene planes within the stacks and separate the unaligned stacks thereby forming a particulate wherein said particulate has a thickness less than about 100 nanometers and said shearing is not ball milling.

2. The method according to claim 1 wherein said heat treating is to at least 2200 degrees C.

3. The method according to claim 1 wherein said graphitizable polymer selected from the group consisting of polyphenylenoxadiazoles (POD), polybenzothiazole (PBT), polybenzohisthiazole (PBBT), polybenzooxazole (PBO), polybenzobisoxazole (PBBO), aromatic potyimides (PI), aromatic polyamides (PA), polyphenylenbenzoimidazole (PBI), polyphenylenebenzobisimidazole (PPBI), polythiazole (PT), poly-p-phenylenevinylene (PPV) or mixtures thereof.

4. The method according to claim 1 wherein said graphitizable polymer film is from between 10 and 100 microns thick.

5. The: method according to claim 4 wherein said, graphitizable polymer film is less than about 75 microns thick.

6. The method according to claim 1 wherein said particulate has a thickness less than about 25 nanometers.

7. The method according claim 1 wherein said shearing comprises mechanical shearing using a centrifugal mill.

8. The method according to claim 7 wherein said shearing occurs between a rotor and a fixed ring sleeve.

9. The method according to claim 1 wherein said heat treated film exhibits an (002) peak d-spacing from between about 3.3500 Å to about 3.4300 Å.

10. The method according to claim 1 wherein said heat treated film exhibits an (002) peak d-spacing greater than about 3.3500 Å.

11. The method according to claim 1 wherein said heat treated film exhibits a crystal size Le from between about 50 Å to about 600 Å.

12. The method according to claim 1 wherein the thickness comprises no more than 75 nanometers.

13. The method according to claim 1 wherein said shearing includes a blade contacting the heat treated film in a direction parallel to a major surface of the heat treated film.

14. A method of producing a graphene powder comprising:
    heat treating to between 2000 degrees C. and 2600 degrees C. a graphitizable polymer film having a thickness from between about 10 microns to about 200 microns thereby forming a heat treated film having a turbostratic graphitic structure of stacks of aligned graphene planes of between 5 graphene layers to 200 graphene layers, wherein the stacks are unaligned; and
    shearing the heat treated film along a plane parallel to a major surface of the heat treated film to delaminate the graphene planes within the stacks and separate the unaligned stacks thereby forming a particulate wherein said particulate has a thickness less than about 1000 nanometers and said shearing is not ball milling.

15. method of claim 14 wherein the particulate thickness comprises no more than 250 nanometers.

16. The method of claim 14 wherein the graphitizable polymer film is formed from a precursor film having a thickness comprising from about 25 microns to about 75 microns.

17. The method according claim 14 wherein said shearing comprises mechanical shearing using a centrifugal mill.

18. The method according to claim 17 wherein said shearing occurs between a rotor and a fixed ring sleeve.

19. The method according to claim 14 wherein said heat treated film exhibits a crystal size Le from between about 50 Å to about 600 Å.

20. The method according to claim 14 wherein said shearing includes a blade contacting the heat treated film in a direction parallel to a major surface of the heat treated film.

* * * * *